(12) United States Patent
Hoefler et al.

(10) Patent No.: US 7,357,603 B2
(45) Date of Patent: Apr. 15, 2008

(54) TOOLHOLDER AND CUTTING INSERT USED THEREIN

(75) Inventors: Brian D. Hoefler, Greensburg, PA (US); Stephen J. Shubert, Marshall, MI (US); Ruy Frota de Souza Filho, Latrobe, PA (US); Scott W. Lebo, Ligonier, PA (US); Ronald L. Dudzinsky, Derry, PA (US)

(73) Assignee: Kennametal Inc., Latrobe, PA (US)

( * ) Notice: Subject to any disclaimer, the term of this patent is extended or adjusted under 35 U.S.C. 154(b) by 427 days.

(21) Appl. No.: 10/827,898

(22) Filed: Apr. 20, 2004

(65) Prior Publication Data

US 2004/0265073 A1   Dec. 30, 2004

Related U.S. Application Data

(63) Continuation-in-part of application No. 10/328,864, filed on Dec. 24, 2002, now Pat. No. 6,722,823, and a continuation-in-part of application No. 10/328,865, filed on Dec. 24, 2002, now Pat. No. 6,742,969.

(51) Int. Cl.
*B23C 5/02* (2006.01)

(52) U.S. Cl. .......................... 407/66; 407/67; 407/113; 407/115

(58) Field of Classification Search .................. 407/66, 407/67, 113, 115, 114, 116, 117
See application file for complete search history.

(56) References Cited

U.S. PATENT DOCUMENTS 2,186,417 A    1/1940   Kraus
3,434,190 A    3/1969   Kaiser
4,531,864 A    7/1985   Bylund
4,551,048 A   11/1985   Phillips et al.
4,597,695 A    7/1986   Johnson
4,682,916 A *  7/1987   Briese ........................ 407/113
5,163,788 A * 11/1992   Dahl et al. .................... 407/46
5,209,611 A    5/1993   Drescher
5,639,189 A    6/1997   Hoefler
5,820,308 A * 10/1998   Hoefler ........................ 407/40
5,868,529 A    2/1999   Rothballer et al.
6,722,823 B1*  4/2004   de Souza et al. ............. 407/40

FOREIGN PATENT DOCUMENTS

DE      876940        5/1953
EP    0 104517 A2     4/1984
JP     61-38812 A     2/1986
JP     61-86116 A     5/1986

OTHER PUBLICATIONS

Photographs of Cam Lobe Milling Cutter With Inserts manufactured by Belcar Products prior to Dec. 2002 (3 pgs.).

* cited by examiner

*Primary Examiner*—Willmon Fridie, Jr.
(74) *Attorney, Agent, or Firm*—Larry R. Meenan (57) ABSTRACT

A toolholder at least one cutting insert mounted within a pocket about the peripheral wall of the cutter body. The body includes a pocket having an angled retention ledge which provides acts, in conjunction with a fastener, to securely retain an insert mounted therein. The insert has an angled edge which conforms with and works in conjunction with the toolholder pocket.

36 Claims, 7 Drawing Sheets

TOOLHOLDER AND CUTTING INSERT USED THEREIN

CROSS REFERENCE TO RELATED APPLICATIONS

This application is a continuation-in-part of U.S. application Ser. No. 10/328,864 filed Dec. 24, 2002 now U.S. Pat. No. 6,722,823 scheduled to issue on Apr. 20, 2004 as U.S. Pat. No. 6,722,823. This application is also a continuation-in-part of currently U.S. application Ser. No. 10/328,865 filed Dec. 24, 2002 now U.S. Pat. No. 6,742,969.

BACKGROUND OF THE INVENTION

1. Field of the Invention

This invention relates to toolholders and inserts used therein and, more specifically, to a milling cutter having angled pockets with a chip clearance groove to permit a greater number of inserts to be mounted within the cutter and the inserts used therein and furthermore to a toolholder having a pocket configured to secure an insert and to the insert secured therein.

2. Description of Related Art

A goal of most metalworking operations is to perform a given machining task in the least amount of time and in a manner that will not result in premature tool failure. As an example, in a milling operation, it is well known that the cutting forces upon, and the tool wear of, individual inserts within a milling cutter will be diminished if the cutting load is evenly distributed among many inserts in the milling cutter. However, in the past, milling cutter body designs have limited the maximum number of cutting inserts to be placed in the body. Utilizing a cutter with the maximum number of inserts is especially important for the machining of cam lobes on camshafts of internal combustion engines.

U.S. Pat. No. 5,820,308 is directed to a milling cutter having a plurality of on-edge inserts mounted about the periphery of the cutter. The orientation of these on-edge inserts limits the number of inserts that will fit within the cutter body.

Additionally, securing inserts within the pockets of a milling cutter or other toolholder in an efficient manner is always a goal in the metalworking industry.

SUMMARY OF THE INVENTION

The present invention is directed to a toolholder comprising a cutter body rotatable about a central axis, a peripheral wall on the cutter body, and insert pockets located in the peripheral wall. Each pocket is spaced from an adjacent pocket by a lug and each pocket has support surfaces including a bottom surface adapted for positioning a rectangular insert within a predefined rectangular envelope within the pocket. Each rectangular envelope has a front and back and four sides therebetween, including a top side, a bottom side and a radially inward side. Each lug has a radial width, a front face extending upwardly from the pocket bottom to the top of the lug, an axial face extending downwardly from the top of the lug to a height below the top of the lug; and a rear face extending from the axial face downwardly to the bottom surface of an adjacent pocket. The support surfaces of the pocket are defined by the lug front face, the bottom surface, and a pocket wall positioned radially inwardly from the peripheral wall and connecting adjacent lugs. The lug axial face is sloped downwardly across the entire lug width from the top of the lug to the lug rear face, thereby providing a chip clearance groove across the entire width of the lug. The lug front face extends over the back of the insert envelope. Furthermore, at least a portion of the bottom surface of the pocket forms a first angle with the front face of the lug to define a first retention ledge and wherein the first angle is acute.

The invention is further directed to a toolholder assembly comprising a toolholder as described above and including inserts within each pocket of the toolholder, which may be a milling cutter.

The invention is not limited to a milling cutter but includes any toolholder having a pocket with features that promote secure retention of a cutting insert within the pocket utilizing a retention ledge within the pocket as described herein.

The invention is further directed to a cutting insert adapted for use within the subject toolholder.

DETAILED DESCRIPTION OF THE INVENTION

For purposes of describing the subject invention, the pockets of a milling cutter will be discussed with the understanding that such a pocket and the insert associated therewith may be utilized for a variety of other toolholder/insert combinations. As an example, the features of the pocket described hereinafter may be applied to a toolholder for a turning operation, threading operation, facing operation, etc. wherein the toolholder secures at least one cutting insert therein.

Figure 1:
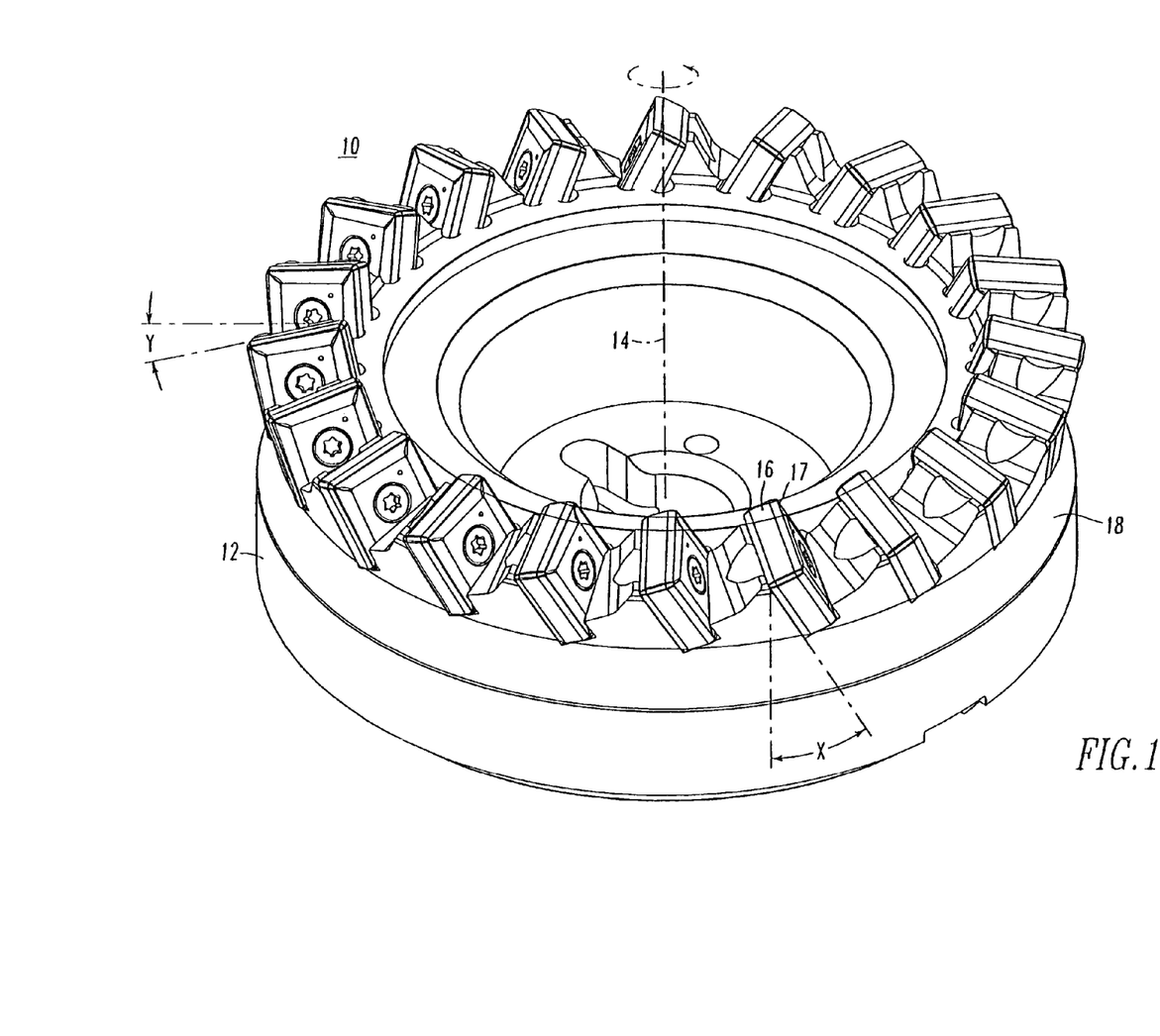
FIG. 1 illustrates a perspective view of a milling cutter in accordance with the subject invention.

Directing attention to FIG. 1, a toolholder, or milling cutter 10, is illustrated having a cutter body 12 rotatable about a central axis 14. A plurality of cutting inserts 16 may be mounted about the peripheral wall 18 within pockets 20 (FIG. 2) therein. The cutting inserts 16 are identified as lay-down inserts.

A lay-down cutting insert is one where the cutting face of the insert is located on the largest seating surface of the insert. On the other hand, an on-edge cutting insert is one where the cutting face of the insert is located on a side of the insert perpendicular to the largest seating surface for the insert. A milling cutter with lay-down inserts, not on-edge inserts, is the subject matter of the present application. Using lay-down cutting inserts, the inventors have discovered a design that permits more inserts to be installed in the milling cutter than if they were to use on-edge-cutting inserts.

The milling cutter 10 may be used for milling operations and, more particularly, may be used for the machining of cam lobes on camshafts used for automotive equipment.

Reference will be made to top and bottom with respect to the elements of FIG. 2, however it should be understood that these terms are used only to describe the relative location of these elements.

For clarity reference will also be made to a single pocket 20 and a single lug 25 with the understanding that each pocket and lug is identical to other pockets and lugs in the cutter body 12. However, separate reference will be made to adjacent pockets 20A, 20B and adjacent lugs 25A, 25B to better describe pocket 20 and lug 25.

Figure 2:
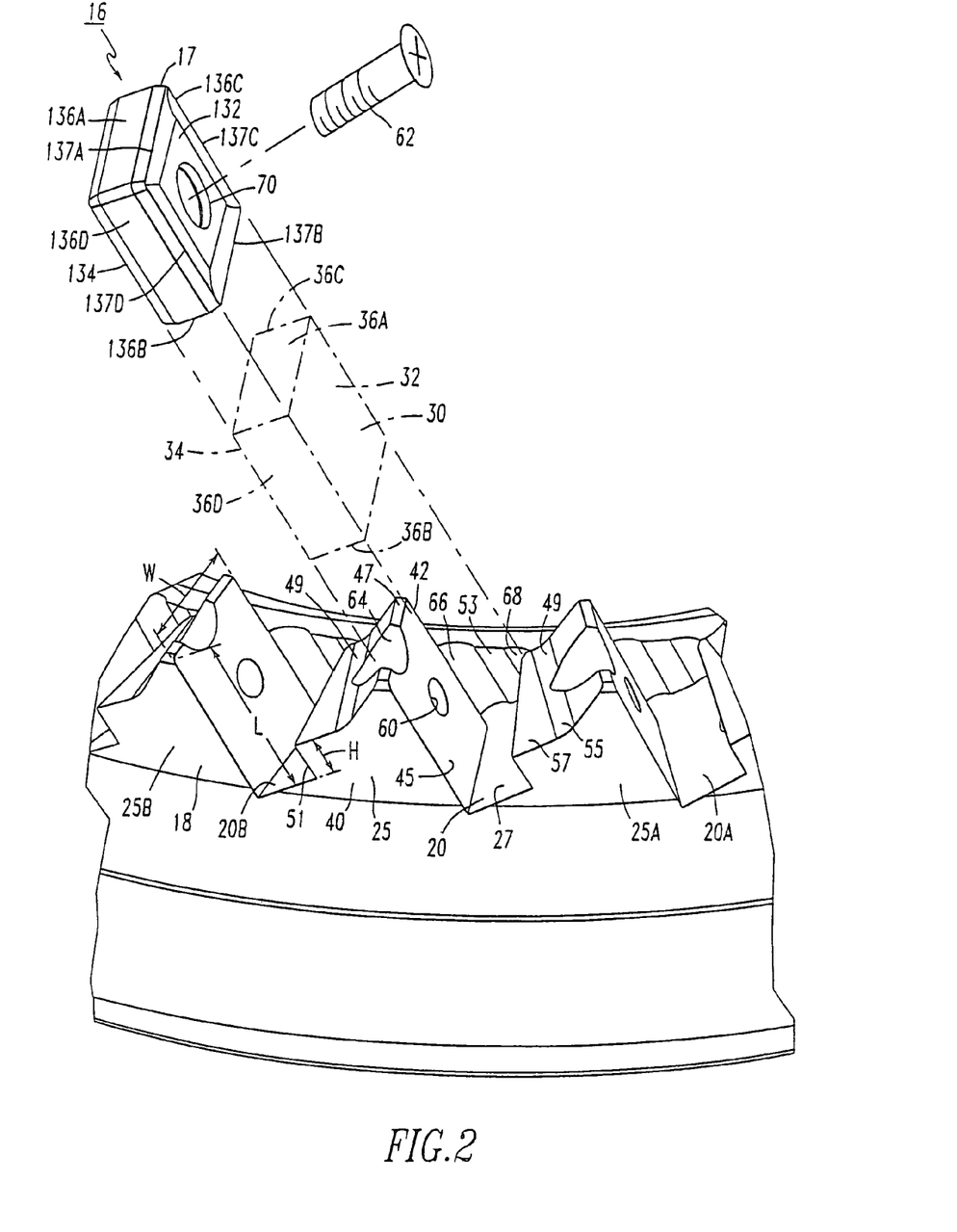
FIG. 2 illustrates an enlarged view from a slightly different perspective view of a portion of the cutter in FIG. 1, however, with a cutting insert retracted from a pocket and a phantom insert envelope introduced for illustrative purposes.

Directing attention to FIG. 2, insert pocket 20 is spaced from an adjacent pocket 20B by a lug 25 and is defined, in large part, by two lugs 25, 25A.

Each pocket 20 has support surfaces including a bottom surface 27. Furthermore, the pocket 20 is adapted for positioning a rectangular insert 16 conforming to a pre-defined rectangular envelope 30 in the pocket 20. Although the insert envelope 30 is actually located within the pocket 20, for clarity in illustration, the envelope 30 has been extracted as shown in FIG. 2.

The rectangular envelope 30 has a front surface 32, a back surface 34, and four sides including a top side 36A, a bottom side 36B, a radially inward side 36C, and a radially outward side 36D. Additionally the cutting insert 16 has a front 132, a back 134, and four sides including a top side 136A, a bottom side 136B, a radially inward side 136C, and a radially outward side 136D. At the intersection of the front 132 and each of the sides 136A, 136B, 136C and 136D of the insert 16 there are cutting edges 137A, 137B, 137C and 137D respectively. However, it is possible for certain insert designs to include only cutting edges 137A and 137B.

Each lug 25 has a radially outward surface 40 and a radially inward surface 42 defining therebetween a radial width W which for clarity is shown on an adjacent lug 25B. Each lug 25 furthermore has a front face 45 extending upwardly from the pocket bottom 27 to the top 47 of the lug 25. Each lug 25 furthermore has an axial face 49 extending downwardly from the top 47 of the lug 25 to a height H (See lug 25B) which is less than the height L of the lug. Each lug 25 furthermore has a rear face 51 extending downwardly from the axial face 49 of an adjacent lug 25A to the bottom surface 27 of pocket 20.

The support surfaces of pocket 20 are defined by the lug front face 45, the pocket bottom surface 27, and a pocket wall 53 positioned radially inwardly from the peripheral wall 18 whereby the pocket wall 53 connects adjacent lugs 25, 25A. The lug axial face 49 is sloped downwardly across the entire lug width W from the top 47 of the lug 25 to the lug rear face 51. By doing so, a chip clearance groove 55 is provided across the entire width W of the lug 25.

To provide maximum support to the cutting insert 16 within the pocket 20, the lug front face 45 extends over the back side 134 of the insert 16.

To maximize the size of the clearance groove 55, the lug rear face 51 preferably extends from the bottom surface 27 to a distance H which is no higher than half way up the side of the insert 16, when the insert is mounted within the pocket 20. To further enhance the chip clearance groove 55, the lug axial face 49 has a planar portion 57 which may be generally perpendicular to the lug front face 45.

Each lug front face 45 has a bore 60 therethrough to accept a mounting screw 62 that is designed to extend within a mounting bore 70 through the cutting insert 16 and to secure the insert 16 within the pocket 20. Furthermore, each pocket 20 is angled about the central axis 14 (FIG. 1) by an axial rake angle X which may be between −20° and 20° and preferably is between −5° and 5° to permit multiple inserts 16 to be mounted in the cutter body 12 and furthermore to provide access for inserting and for removing the mounting screw 62. Each lug 25 furthermore has an access groove 64 (FIG. 2) within the lug front face 45 and the lug axial face 49 to permit greater access to the mounting screw 62 secured within the lug front face 45. Although the access groove 64 is illustrated as curved, this is only a matter of convenience.

The lug rear face 51, as previously mentioned, extends upwardly from the bottom surface 27. This not only determines the size of the chip clearance groove 55 but furthermore, in conjunction with the bottom surface 27, protects the bottom edge 137B of the cutting insert 16 that is mounted within the pocket 20.

To protect the side cutting edge 137C of a cutting insert 16, the pocket wall 53 may further include at least one recessed groove 66 parallel to the lug front face 45. It is entirely possible that the cutting insert 16 has a cutting edge on side 136C but opposite cutting edge 137C. Under the circumstances, a second recessed groove 68 may exist such that, together, recessed grooves 66, 68 protect the cutting edge 137C and a cutting edge on the opposite side of 136C. These recesses 66, 68 also provide relief for the cutting edges positioned within the recesses 66, 68.

It should be noted that the pocket wall 53 extends only partially to the top 47 of the lug 25. In one embodiment the pocket wall 53 extends no more than a distance of at least fifty-percent of the length of an insert that would be mounted within the pocket 20. The purpose of this shortened height is to provide clearance during a cam lobe milling operations such that the cutter body 12 does not interfere with adjacent lobes on a cam shaft that are not currently being machined by the cutter 10.

From inspection of FIG. 1, one corner 17 of each of the inserts 16 is protruding and foremost in the cutter body 12 such that during a milling operation this corner will be the first to engage a workpiece. The bottom surface 27 of the pocket 20 is oriented to position the rectangular insert 16 such that this corner 17 of the insert 16 protrudes beyond the cutter body 12. In particular, the pocket bottom surface 27 is angled to provide a bevel angle Y of between 0° and 90° and preferably between 40° and 90°.

Finally, the lug front face 45 may be oriented at a radial rake angle relative to a radial line extending from the central axis 14 to form an angle of between −10° and 20° and is preferably of between −5° and 5°. Radial rake angles are well known by those skilled in the art of metalworking and for that reason the radial rake angle is not illustrated in FIG. 1.

It should be appreciated that the insert 16 suitable for the pockets 20 discussed herein has been described as rectangular and it is entirely possible that such a rectangle may be a square.

Furthermore, while the insert 300 has been illustrated as double-sided, i.e. cutting edges on both sides of the insert 300, and the insert 300 has been illustrated as indexable, it is entirely possible to have an insert without these features.

While the subject invention so far has been directed to a milling cutter 10 having a body 12 with reference to a cutting insert 16 mounted within a pocket 20, it should be appreciated that the invention may be directed to the milling cutter body 12 alone without cutting inserts 16 mounted therein. However, under these circumstances, the insert envelope 30, which is a predetermined shape based upon an insert for which the cutter body 12 was designed, will define the shape of the pocket 20.

Figure 3:
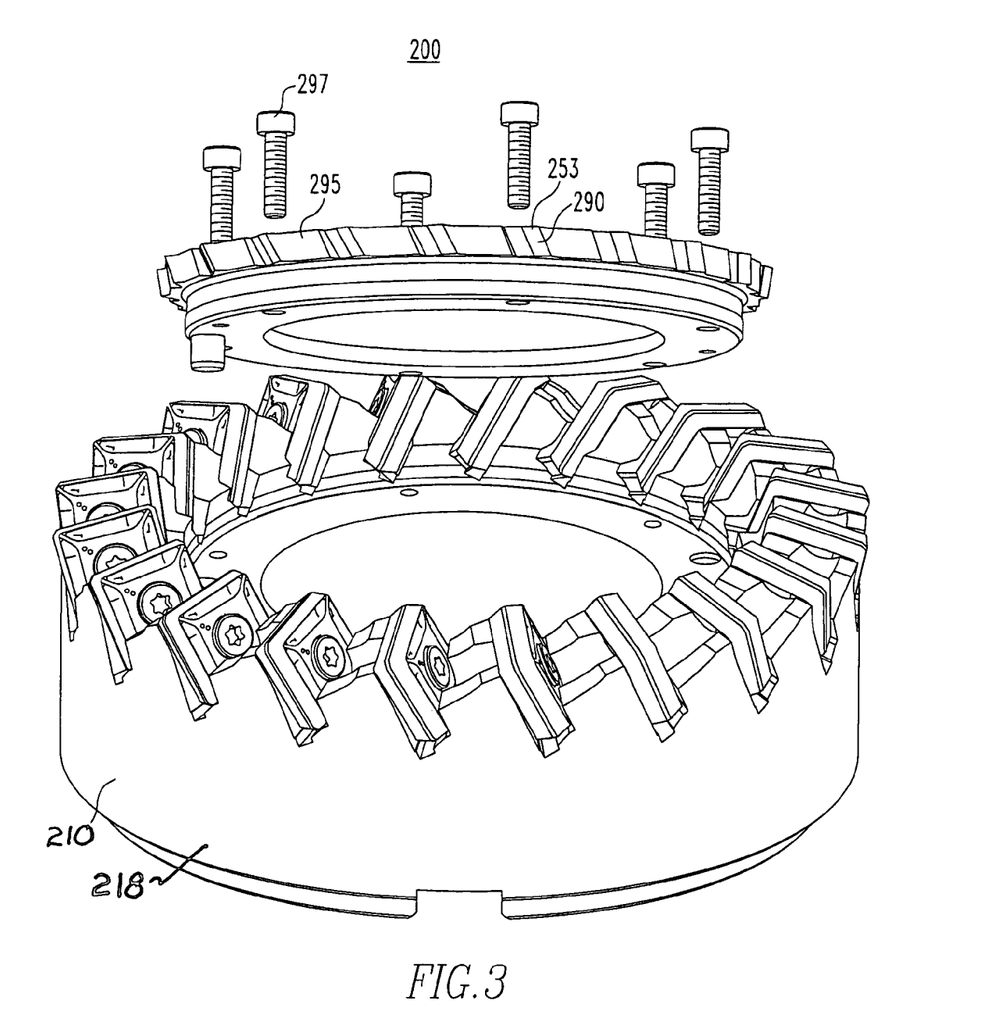
FIG. 3 illustrates a perspective view of another embodiment of a milling cutter in accordance with the subject invention.

A second embodiment is illustrated with milling cutter 200 in FIG. 3. With the exception of the details discussed hereinafter, all of the other details of the milling cutter 200 are identical to those previously discussed for milling cutter 10. Briefly referring to FIG. 2, a pocket 20 was essentially rectangular in shape with straight sides adapted to support a generally rectangular insert 16.

Figure 4:
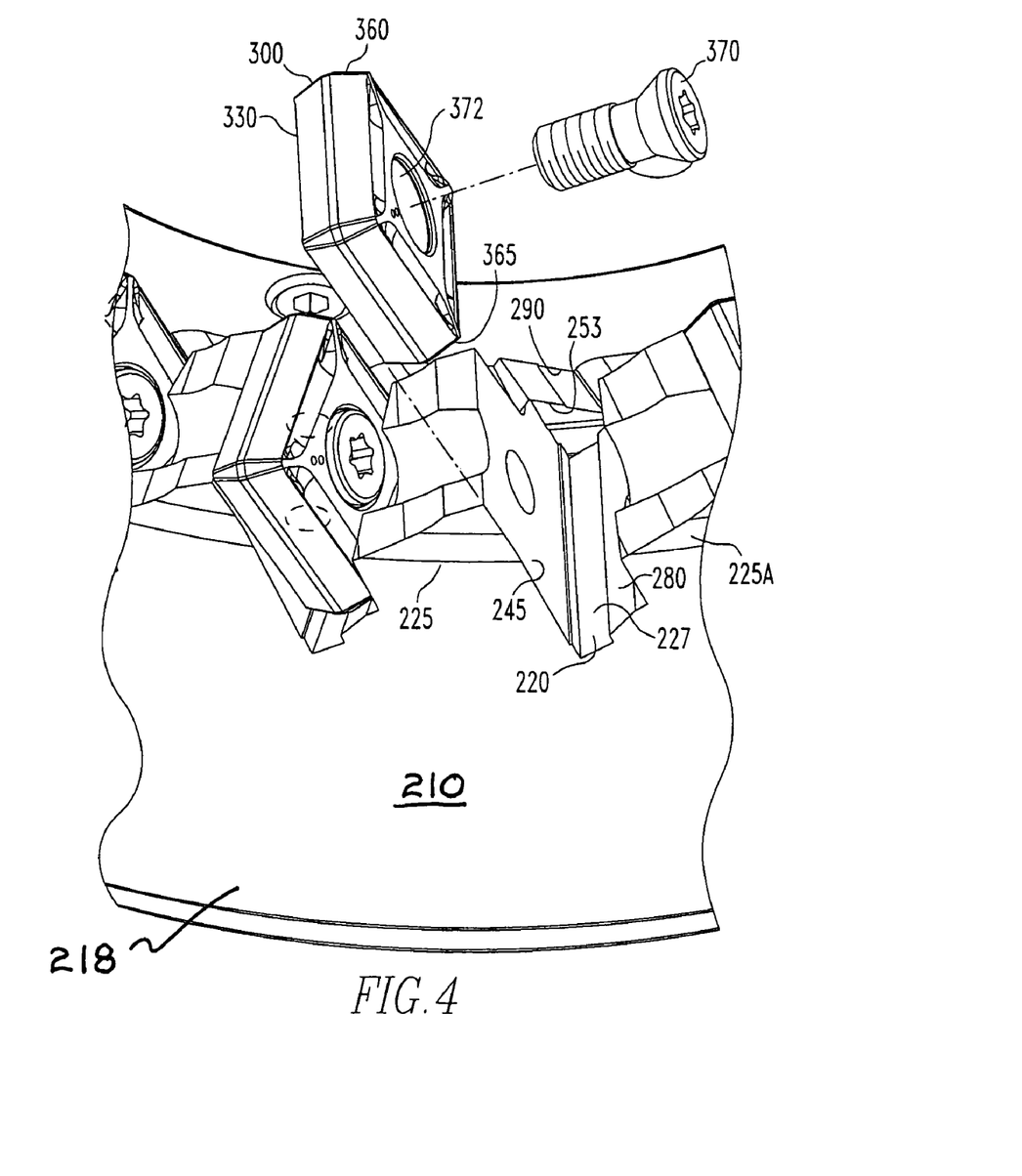
FIG. 4 illustrates an enlarged view from a slightly different perspective of a portion of the cutter in FIG. 3, however, with a cutting insert retracted from a pocket.
Figure 5:
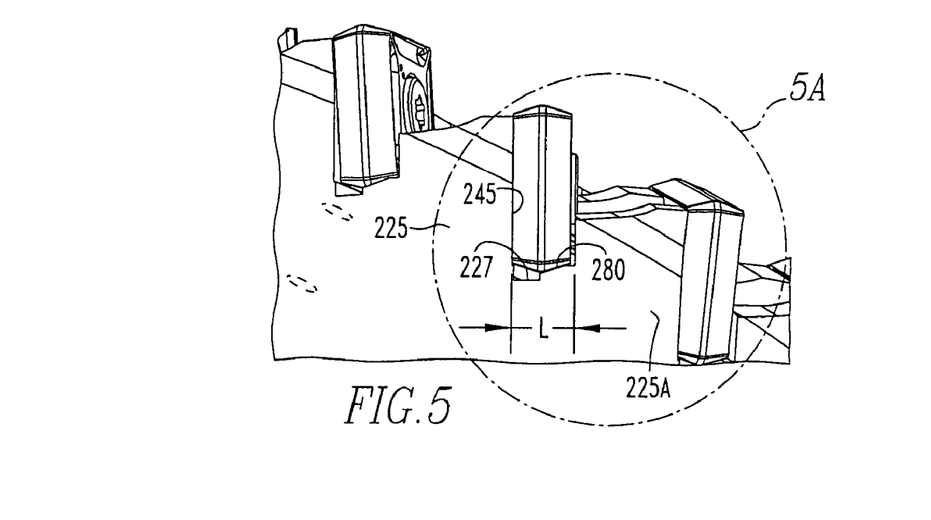
FIG. 5 is a side view of the milling cutter illustrated in FIG. 3 looking directly at the side of an insert.
Figure 5A:
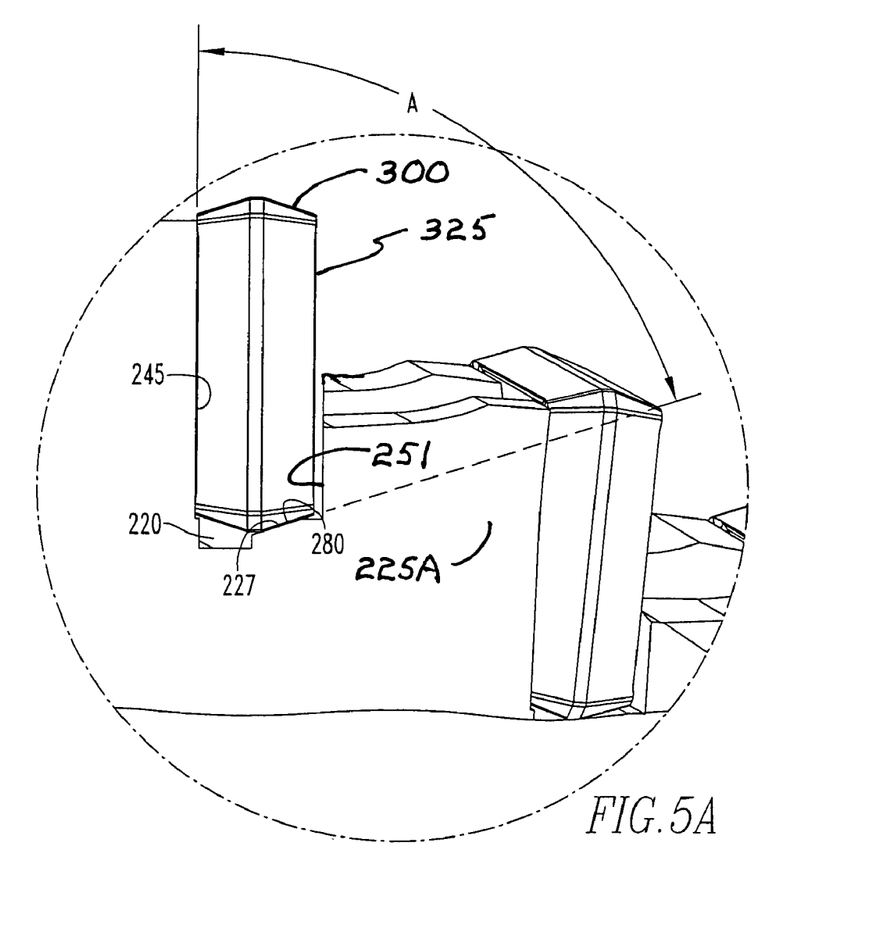
FIG. 5A is an enlarged view of the encircled portion in FIG. 5.

It has been determined that additional support may be provided to an insert within a pocket by modifying the sides of the insert and the walls of the pocket. In particular, as illustrated in FIG. 4 and as further illustrated in FIGS. 5 and 5A, at least a portion of the bottom surface 227 of the pocket 220 forms a first angle A with the front face 245 of the lug 225 to define a first retention ledge 280. As illustrated in FIGS. 5 and 5A, the first angle A is acute and may be between 45° and 85°. Additionally, the bottom surface 227 has a length L between lug 225 and lug 225A and the first retention ledge 280 extends along at least one fourth of the length L at a location spaced from the lug front face 245.

For clarity, FIG. 5A in the region of the cutting insert 300 has certain contour lines removed, which exist in FIG. 5, to more clearly illustrate the gap that exists between the front surface 325 of the insert 300 and the rear face 251 of the lug 225A. The fastener 370 (FIG. 4) is recessed within the bore 372 of the insert 300 so that the head of the fastener 370 is recessed or at least flush with the front surface 325 of the insert 300. It should be noted, as illustrated in FIG. 5A, there is no contact between the front surface 325 of the insert 300 and the rear face 251 of the lug 225A.

As illustrated in FIG. 4 the pocket 220 has a pocket wall 253. Directing attention to FIGS. 6 and 6A, at least a portion of the pocket wall 253 may form a second angle B with the front face 245 of the lug 225 to define a second retention ledge 290. The second angle is acute and may be between 45° and 85°. Additionally, the second retention ledge 290 extends along at least one fourth of the length L at a location spaced from the front face 245 of the lug 225. In one embodiment the first angle A and the second angle B are equal.

Figure 6:
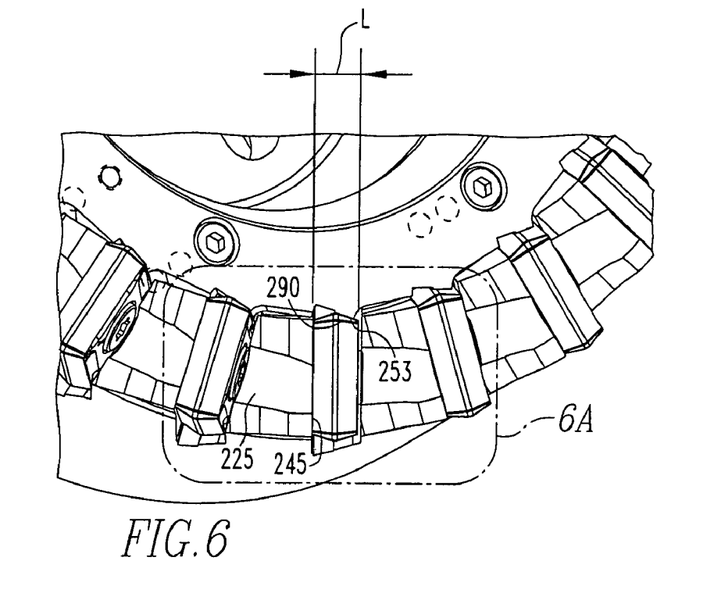
FIG. 6 is a top view of a portion of the milling cutter looking directly down upon the same insert.
Figure 6A:
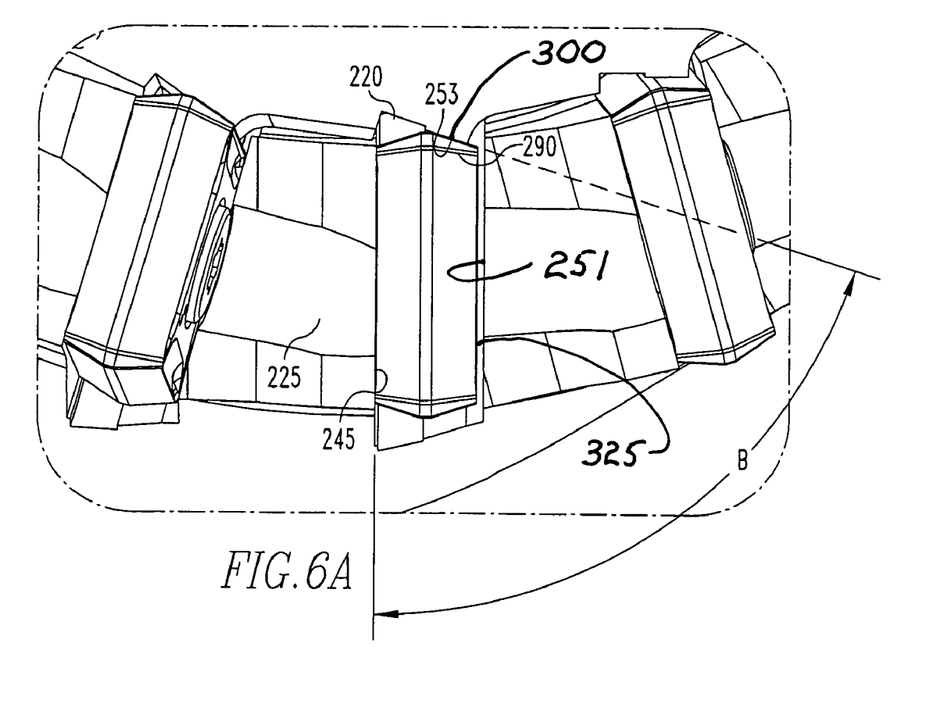
FIG. 6A is an enlarged view of the encircled portion in FIG. 6.

Just as with FIG. 5A, for clarity, FIG. 6A in the region of the cutting insert 300 has certain contour lines removed, which exist in FIG. 6, to more clearly illustrate the gap that exists between the front surface 325 of the insert 300 and the rear face 251 of the lug 225A. The fastener 370 (FIG. 4) is recessed within the bore 372 of the insert 300 so that the head of the fastener 372 is recessed or at least flush with the front surface 325 of the insert 325. It should be noted, as illustrated in FIG. 6, there is no contact between the front surface 325 of the insert 300 and the rear face 251 of the lug 225A.

In the previous embodiment of the milling cutter 10 the pocket wall 53 was integral with the milling cutter body 12. However, as illustrated in figure 3 the pocket wall 253 of milling cutter 200, which includes the second retention ledge 290 may be part of an annular ring 295 which conforms to the contour of each pocket wall (253 for example) wherein when the annular ring 295 is secured to the cutter body 210, the pocket wall 253 is positioned at the pocket 220 and the pocket walls associated with other pockets are also simultaneously positioned. The annular ring 295 may be secured to the body 210 utilizing threaded bolts 297 secured to the cutter body 210 or using any other conventional technique. The annular ring 295 is removable which improves access to inserts that may be within the pockets. Use of this annular ring 295 furthermore simplifies the manufacturing process.

Figure 7:
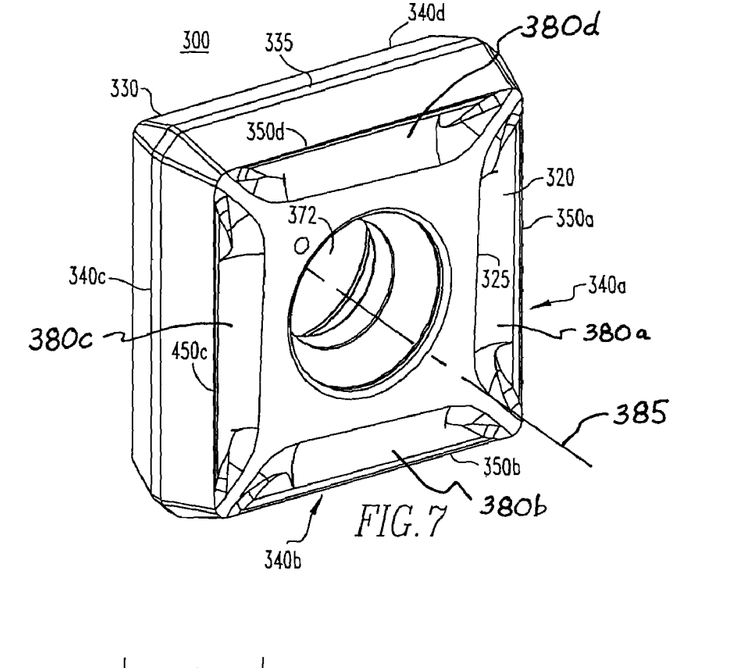
FIG. 7 is a perspective view of a cutting insert utilized with the subject milling cutter.
Figure 8:
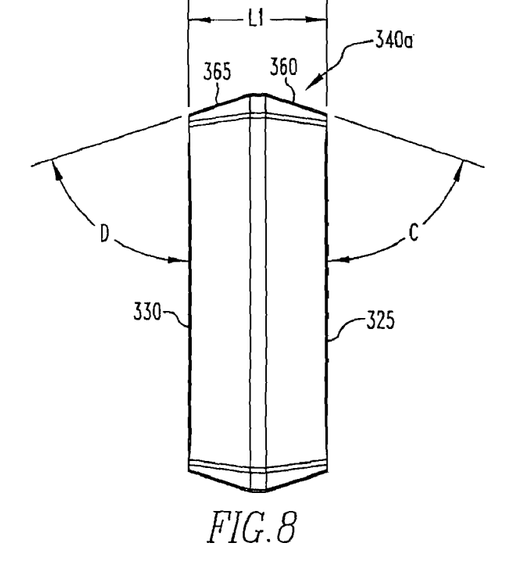
FIG. 8 is a top view of the cutting insert illustrated in FIG. 7.
Figure 9:
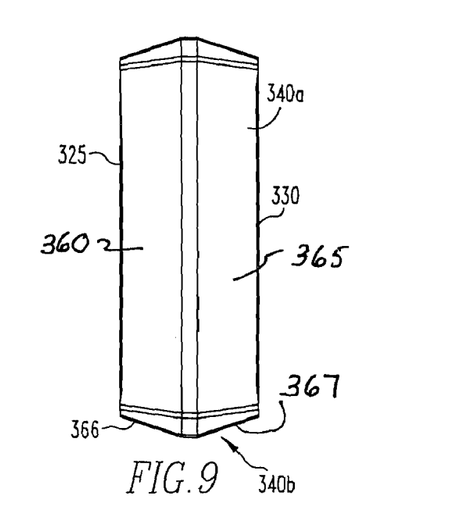
FIG. 9 is a side view of the cutting insert illustrated in FIG. 7.

An insert 300 that is suitable for retention in the pocket 220 (FIG. 4) is illustrated in detail in FIGS. 7-9. In particular, the insert 300 is a polygonal body 320 comprising a front surface 325 and back surface 330 opposing the front surface 325.

The insert 300 has a peripheral wall 335 between the front surface 325 and the back surface 330 with sides 340*a*, 340*b*, 340*c*, 340*d*. Cutting edges 350*a*, 350*b*, 350*c*, 350*d* are formed at the intersection of the peripheral wall 335 and the front surface 325. Additional cutting edges (not labeled) are formed at the intersection of the peripheral wall 335 and the back surface 330 of the insert 300.

Each side, for example side 340*a*, has two opposing beveled surfaces 360, 365 thereupon. A first beveled surface 360 is proximate to the front surface 325 and a second beveled surface 365 is proximate to the back surface 330. Together, the beveled surfaces 360, 365 extend over at least fifty percent of the length L1 of the side 340*a*. In a preferred embodiment, the beveled surfaces 360, 365 extend over at least ninety percent of the length L1 of the side 340*a*.

Directing attention to FIG. 8, the first beveled surface 360 forms a bevel angle C with the front surface 325 and the second beveled surface 365 forms a second bevel angle D with the back surface 330. Each angle C and angle D is acute angles and are between 45° and 85°.

While only two beveled surfaces 360, 365 have been discussed, it should be appreciated that each side 340*a* 340*b*, 340*c*, 340*d* of the insert 300 has a similar pair of opposing beveled surfaces. As an example, the two beveled surfaces associated with side 340*a* as illustrated in FIG. 8 are beveled surface 360 and beveled surface 365, while the two beveled surfaces associated with side 340*b* are beveled surface 366 and beveled surface 367. Furthermore, for each side 340*a*, 340*b*, 340*c*, 340*d* the two opposing beveled surfaces thereon extend over at least fifty percent of the length of the respective side.

The cutting insert 300 illustrated in FIGS. 7-9 has a generally square shape and may be indexed to present a different cutting edge to the workpiece. Since there are four separate cutting edges associated with both the top surface and the bottom surface of the insert, a total of eight cutting edges may be selected for a machining operation.

Directing attention to FIG. 4 and FIGS. 7-9, the shape on the insert 300 and the shape of the pocket 220 are compatible with one another. In particular, the back surface 330 of the insert 300 rests against the front face 245 of the lug 225 while the beveled surface 365 on side 340*b* of insert 300 contacts the first retention ledge 280. Furthermore, the beveled surface 360 on side 340*a* of the insert 300 contacts the second retention ledge 290 on the pocket wall 253 of the cutter body 210. Just as before, a fastener 370 extending through a bore 372 of the cutting insert 300 may be used to secure the cutting insert 300 within a bore 372 extending within the front face 245 of the lug 225. The front surface 325 and the back surface 330 are generally planar and each include grooves 380*a*, 380*b*, 380*c*, 380*d* along the cutting edges 350*a*, 350*b*, 350*c*, 350*d*, The grooves 380*a*, 380*b*, 380*c*, 380*d* extend downwardly and inwardly away from the cutting edge 350*a*, 350*b* 350*c*, 350*d* toward the centerline 385 and then upwardly to meet the planar front surface 325 to form chip breaking grooves and also to retain the planar front surface 325 and the planar rear surface 330 as mounting surfaces.

The embodiment so far described has been directed to a milling cutter, which is one type of a toolholder. The invention generally is directed to a toolholder having a body 210 with a peripheral wall 218 on the body 210. A pocket 220 is recessed within the peripheral wall 218. The pocket 220 has support surfaces for positioning a generally rectangular insert within a predefined rectangular envelope within the pocket 220 including a bottom surface 227 and a front face 245, also referred to as a lug front face 245, extending upwardly from the pocket bottom surface 227 to a top side 236 of the body 210. A pocket wall 253 is positioned inwardly from the peripheral wall 218. At least a portion of the bottom surface 227 of the pocket 220 forms a first angle A with the front face 245 of the pocket 220 to define a first retention ledge 280. The first angle A is acute. At least a portion of the pocket wall 253 may form a second angle B with the front face 245 of the body 210 to define a second retention ledge 290. The second angle B is acute.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A toolholder comprising:
   a) a cutter body rotatable about a central axis;
   b) a peripheral wall on the cutter body;
   c) insert pockets located in the peripheral wall, wherein each pocket is spaced from an adjacent pocket by a lug and wherein each pocket has support surfaces including a bottom surface adapted for positioning a rectangular insert within a predefined rectangular envelope within the pocket;
   d) wherein each rectangular envelope has a front and back and four sides therebetween, including a top side, a bottom side and a radially inward side;
   e) wherein each lug has:
      1) a radial width;
      2) a front face extending upwardly from the pocket bottom to the top of the lug;
      3) an axial face extending downwardly from the top of the lug to a height below the top of the lug; and
      4) a rear face extending from the axial face downwardly to the bottom surface of an adjacent pocket,
   f) wherein the support surfaces of the pocket are defined by the lug front face, the bottom surface, and a pocket wall positioned radially inwardly from the peripheral wall and connecting adjacent lugs;
   g) wherein the lug axial face is sloped downwardly across the entire lug width from the top of the lug to the lug rear face, thereby providing a chip clearance groove across the entire width of the lug; and
   h) wherein the lug front face extends over the back of the insert envelope.

2. The toolholder according to claim 1, wherein at least a portion of the bottom surface of the pocket forms a first angle with the front face of the lug to define a first retention ledge and, wherein the first angle is acute and wherein the bottom surface has a length between adjacent lugs and the first retention ledge extends along at least one-fourth of the length at a location spaced from the lug front face.

3. The toolholder according to claim 2, wherein the first angle is between 45-85 degrees.

4. The toolholder according to claim 2, wherein at least a portion of the pocket wall forms a second angle with the front face of the lug to define a second retention ledge and wherein the second angle is acute.

5. The toolholder according to claim 4, wherein the pocket wall has a length between adjacent lugs and the second retention ledge extends along at least one-fourth of the length at a location spaced from the lug front face.

6. The toolholder according to claim 5, wherein the second angle is between 45-85 degrees.

7. The toolholder according to claim 4, wherein the first angle and the second angle are equal.

8. The toolholder according to claim 1, wherein the lug rear face extends from the bottom surface to a distance only as high as the lower half of the insert envelope.

9. The toolholder according to claim 1, wherein the lug axial face has a planar portion perpendicular to the lug front face to enlarge the chip clearance groove.

10. The toolholder according to claim 1, wherein each lug front face has a bore therethrough to accept a mounting screw that extends through a cutting insert and secures the insert within the pocket and wherein each pocket is angled about the central axis toward an adjacent lug to permit multiple inserts to be mounted in the cutter and to provide access for inserting and removing the mounting screw.

11. The toolholder according to claim 10, wherein each lug has an access groove within the lug front face and the lug axial face to permit greater access to a mounting screw secured within the lug front face.

12. The toolholder according to claim 1, wherein the lug rear face extends upwardly from the bottom surface to protect the bottom edge of a cutting insert that is able to be mounted within the pocket.

13. The toolholder according to claim 1, wherein the pocket wall extends only partially to the top of the lug to provide clearance for cam lobe milling operations when inserts are mounted within the cutter pockets.

14. The toolholder according to claim 1 wherein the pocket wall is defined by an annular ring with an outer surface conforming to the contour of each pocket wall, wherein when the annular ring is secured to the cutter body, a pocket wall is positioned at each pocket and wherein the annular ring is removable.

15. The toolholder according to claim 13, wherein the pocket wall extends no more than a distance of at least fifty-percent of the length of an insert that would be mounted within the pocket.

16. The toolholder according to claim 1, wherein the bottom surface is oriented to position a rectangular insert such that one corner of the insert would protrude beyond the cutter body.

17. The toolholder according to claim 1, wherein the axial rake angle is between −20° and 20°.

18. The toolholder according to claim 17, wherein the axial rake angle is between −5° and 5°.

19. The toolholder according to claim 1, wherein the bevel angle is between 0° and 90°.

20. The toolholder according to claim 19 wherein the bevel angle is between 40° and 90°.

21. The toolholder according to claim 1, wherein the radial rake angle is between −10° and 20°.

22. The toolholder according to claim 21, wherein the radial rake angle is between −5° and 5°.

23. The toolholder according to claim 1, wherein the rectangular envelope is suited to accommodate a square insert.

24. A toolholder comprising:
a) a cylindrical body rotatable about a central axis;
b) a peripheral wall on the perimeter of the body integral and one with the body;
c) a pocket located about the peripheral wall substantially within the perimeter of the body, wherein the pocket has support surfaces for positioning a generally rectangular insert within a predefined rectangular envelope within the pocket including:
1) a bottom surface associated with a single side of the insert; and
2) a front face extending upwardly from the pocket bottom surface to a top side of the body; and
3) a wall positioned inwardly from the peripheral wall; and
d) wherein at least a portion of the bottom surface of the pocket forms a first angle with the front face of the pocket to define a first retention ledge and wherein the first angle is acute.

25. The toolholder according to claim 24, wherein the bottom surface has a length and the first retention ledge extends along at least one-fourth of the length at a location spaced from the body front face.

26. The toolholder according to claim 25, wherein the first angle is between 45-85 degrees.

27. The toolholder according to claim 24, wherein at least a portion of the pocket wall forms a second angle with the front face of the body to define a second retention ledge and wherein the second angle is acute.

28. The toolholder according to claim 27, wherein the pocket wall has a length and the second retention ledge extends along at least one-fourth of the length at a location spaced from the body front face.

29. A cutting insert having a polygonal body of wear resistant material, said body comprising:
a) a front surface;
b) a back surface opposing the front surface;
c) a peripheral wall with sides and corners about a centerline,
d) at least one cutting edge formed at the intersection of the peripheral wall and one of the front surface or the back surface;
e) wherein each side has a length defined between the front surface and the back surface;
f) wherein at least one side has two opposing beveled surfaces thereupon, wherein a first beveled surface is proximate to the front surface and a second beveled surface is proximate to the back surface and wherein together the beveled surfaces extend over at least fifty-percent of the length of the side; and
g) wherein the front surface is generally planar and includes a groove along the at least one cutting edge, wherein the groove extends downwardly and inwardly away from the cutting edge toward the centerline and then upwardly to meet the planar front surface to form a chip breaking groove and also retain the planar front surface as a mounting surface.

30. The cutting insert according to claim 29, wherein together the beveled surfaces extend over at least 90 percent of the length of the side.

31. The cutting insert according to claim 29, wherein the first beveled surface forms a first bevel angle with the front surface and the second beveled surface forms a second bevel angle with the back surface and wherein each of these angles is acute.

32. The cutting insert according to claim 30, wherein the first bevel angle and the second bevel angle are between 45-85 degrees.

33. The cutting insert according to claim 31, wherein each side of the insert has two opposing beveled surfaces thereupon, wherein a first beveled surface for each side is proximate to the front surface and a second beveled surface for each side is proximate to the back surface and wherein together the beveled surfaces for each side extend over at least fifty-percent of the length of that side.

34. The cutting insert according to claim 29, wherein the shape of the insert is square and four cutting edges exist at the intersection of the front surface with the peripheral wall and four additional cutting edges exist at the intersection of the back surface with the peripheral wall.

35. A toolholder comprising:
a) a cutter body rotatable about a central axis;
b) a peripheral wall on the cutter body;
c) insert pockets located in the peripheral wall, wherein each pocket is spaced from an adjacent pocket by a lug and wherein each pocket has support surfaces including a bottom surface adapted for positioning a rectangular insert within the pocket, wherein at least a portion of the bottom surface of each pocket forms a first angle with the front face of the lug to define a first retention ledge and wherein the first angle is acute;
d) a cutting insert positioned within each pocket and having a rectangular shape with a front surface and a back surface and four sides therebetween, including a top side, a bottom side and a radially inward side, wherein each side has a length between the front surface and the back surface and wherein each has two opposing beveled surfaces thereupon, wherein a first beveled surface is proximate to the front surface and a second beveled surface is proximate to the back surface and wherein together the beveled surfaces extend over at least 50 percent of the length of each side;
e) wherein each lug has:
1) a radial width;
2) a front face extending upwardly from the pocket bottom to the top of the lug;
3) an axial face extending downwardly from the top of the lug to a height below the top of the lug; and
4) a rear face extending from the axial face downwardly to the bottom surface of an adjacent pocket,
f) wherein the support surfaces of the pocket are defined by the lug front face, the bottom surface, and a pocket wall positioned radially inwardly from the peripheral wall and connecting adjacent lugs, wherein at least a portion of the pocket wall of the pocket forms a second angle with the front face of the lug to define a second retention ledge and wherein the second angle is acute;
g) wherein the lug axial face is sloped downwardly across the entire lug width from the top of the lug to the lug rear face, thereby providing a chip clearance groove across the entire width of the lug;
h) wherein the lug front face extends over the back of the insert; and i) wherein the inserts rest within a pocket such that the beveled surfaces of two adjacent sides of an insert contact the first retention ledge and the second retention ledge within a pocket.

36. A milling cutter comprising:
a) a cutter body rotatable about a central axis;
b) a peripheral wall on the cutter body;
c) insert pockets located in the peripheral wall, wherein each pocket is spaced from an adjacent pocket by a lug and wherein each pocket has support surfaces including a bottom surface adapted for positioning a rectangular insert within a predefined rectangular envelope within the pocket;
d) wherein each rectangular envelope has a front and back and four sides therebetween, including a top side, a bottom side and a radially inward side;
e) wherein each lug has:
  1) a radial width;
  2) a front face extending upwardly from the pocket bottom to the top of the lug;
  3) an axial face extending downwardly from the top of the lug to a height below the top of the lug; and
  4) a rear face extending from the axial face downwardly to the bottom surface of an adjacent pocket;
f) wherein the support surfaces of the pocket are defined by the lug front face, the bottom surface, and a pocket wall positioned radially inwardly from the peripheral wall and connecting adjacent lugs;
g) wherein the lug axial face is sloped downwardly across the entire lug width from the top of the lug to the lug rear face, thereby providing a chip clearance groove across the entire width of the lug; and
h) wherein the lug front face extends over the entire back of the insert envelope.

* * * * *